United States Patent
Krause (10) Patent No.: US 9,258,425 B2
(45) Date of Patent: Feb. 9, 2016

(54) METHOD AND SYSTEM FOR SPEAKER VERIFICATION

(71) Applicant: Nuance Communications, Inc., Burlington, MA (US)

(72) Inventor: Nir Moshe Krause, Herzalia (IL)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 13/900,163

(22) Filed: May 22, 2013

(65) Prior Publication Data

US 2014/0348308 A1 Nov. 27, 2014

(51) Int. Cl.
*H04M 1/64* (2006.01)
*H04M 3/523* (2006.01)
(Continued)

(52) U.S. Cl.
CPC .............. *H04M 3/523* (2013.01); *G10L 17/00* (2013.01); *G10L 17/02* (2013.01); *G10L 25/51* (2013.01); *H04M 3/51* (2013.01); *H04M 2201/41* (2013.01)

(58) Field of Classification Search
CPC ..................... H04M 2201/41; H04M 3/42221; H04M 3/385; H04M 3/5175; H04M 2203/402; H04M 3/51; H04M 3/523; H04M 3/5233; H04M 1/66; H04M 2203/6045; H04M 2203/6054; H04M 2250/74; H04M 3/5166; H04M 2201/40; H04M 3/2218; H04M 3/36; H04M 2203/6027; H04M 3/2281; H04M 3/382; H04M 3/42136; H04M 1/271; H04M 3/42102; H04M 15/00; H04M 17/023; H04M 3/38; H04M 1/677; H04M 3/493; H04M 3/533; G10L 17/26; G10L 15/265; G10L 17/06; G10L 17/00; G10L 25/90; G10L 17/005; G10L 15/30; G10L 15/02; G10L 15/22; G06Q 20/3558; G06Q 20/401; H04Q 3/0029; H04Q 3/42
USPC .................. 379/88.01, 88.02, 265.02, 142.05, 379/218.01, 265.09, 88.19, 114.05, 265.01, 379/265.07, 266.01, 88.16, 114.14, 145, 379/221.08, 189, 200, 68, 88.03, 88.25; 704/246, 273, 270.1, 275, 236, 231
See application file for complete search history.

(56) References Cited

U.S. PATENT DOCUMENTS

| | | | |
|---|---|---|---|
| 5,864,810 | A | 1/1999 | Digalakis et al. |
| 6,697,778 | B1 | 2/2004 | Kuhn et al. |

(Continued)

FOREIGN PATENT DOCUMENTS

| | | |
|---|---|---|
| EP | 2770502 A1 | 8/2014 |
| EP | 2806425 A2 | 11/2014 |

(Continued)

OTHER PUBLICATIONS

U.S. Appl. No. 13/776,502 by Daniele Ernesto Colibro, Claudio Vair and Kevin R Farrell, entitled "Method and apparatus for efficient I-vector extraction".

(Continued)

*Primary Examiner* — Akelaw Teshale
(74) *Attorney, Agent, or Firm* — Hamilton, Brook, Smith & Reynolds, P.C.

(57) ABSTRACT

In many scenarios, speaker verification systems can be given a single-channel audio with recordings of multiple speakers. To perform accurate speaker verification, a system can isolate the speech of a speaker. In one embodiment, a method, and corresponding system, of speaker verification includes extracting a target speaker's speech, using a known speaker voiceprint, from an audio recording that includes the target speaker's speech and the known speaker's speech. The known speaker voiceprint can correspond to the known speaker. Extracting the target speaker's speech can include determining portions of the audio recording where the known speaker voiceprint matches the known speaker's speech above a particular threshold, and extracting the target speaker's speech from other portions of the audio recording. In this manner, speaker verification is performed on the target speaker's speech without interference from the known speaker's speech and allows for a more accurate verification.

21 Claims, 9 Drawing Sheets

(51) Int. Cl.
*G10L 25/51* (2013.01)
*H04M 3/51* (2006.01)
*G10L 17/02* (2013.01)
*G10L 17/00* (2013.01)

(56) References Cited

U.S. PATENT DOCUMENTS

| | | | |
|---|---|---|---|
| 7,299,177 B2* | 11/2007 | Broman et al. | 704/246 |
| 2003/0108160 A1* | 6/2003 | Brown et al. | 379/88.01 |
| 2007/0043565 A1 | 2/2007 | Aggarwal et al. | |
| 2008/0205624 A1* | 8/2008 | Mandalia | H04M 3/51 379/265.02 |
| 2010/0278317 A1* | 11/2010 | Broman | G06Q 20/341 379/88.02 |
| 2011/0004475 A1 | 1/2011 | Bellegarda | |
| 2011/0040561 A1 | 2/2011 | Vair et al. | |
| 2011/0119060 A1 | 5/2011 | Aronowitz | |
| 2012/0263285 A1* | 10/2012 | Rajakumar | G10L 17/00 379/189 |
| 2014/0222423 A1 | 8/2014 | Cumani et al. | |
| 2014/0222428 A1 | 8/2014 | Cumani et al. | |
| 2014/0244257 A1 | 8/2014 | Colibro et al. | |

FOREIGN PATENT DOCUMENTS

WO WO 2006/126183 A2 11/2006
WO WO 2013/124455 A1 8/2013

OTHER PUBLICATIONS

U.S. Appl. No. 13/762,213, by Sandro Cumani and Pietro Laface, entitled "Method and apparatus for automated parameters adaptation in a deployed speaker verification system".

Cumani, S., et al., "Fast Discriminative Speaker Verification in the I-Vector Space," in *Proceedings of ICASSP 2011*, pp. 4852-4855 (2011).

Glembek, O., et al., "Simplification and Optimization of I-Vector Extraction," in *Proceedings of ICASSP 2011*, pp. 4516-4519 (2011).

Aronowitz, H. and Barkan, O., "Efficient Approximated I-Vector Extraction," in *Proceedings of ICASSP 2012*, pp. 4789-4792 (2012).

Kenny, P., "A Small Footprint i-Vector Extractor," in *Proceedings of Odyssey 2012*, pp. 1-6 (2012).

Cumani, S., et al., "Memory and computation effective approaches for i-vector extraction," in *Proceedings of Odyssey 2012*, pp. 7-13 (2012).

Kenny, P., "Joint Factor Analysis of Speaker and Session Variability: Theory and Algorithms," 2005. Technical report CRIM-Jun. 8, 2013.

Yin, Shou-Chun, et al., "A Joint Factor Analysis Approach to Progressive Model Adaptation in Text-Independent Speaker Verification", IEEE Transaction on Audio, Speech, and Language Processing. vol. 15, No. 7, pp. 1999-2010, (Sep. 2007).

\* cited by examiner

METHOD AND SYSTEM FOR SPEAKER VERIFICATION

BACKGROUND

Call centers receive calls from customers and connect the customers with an appropriate agent based on the caller's query. Typically, companies employ call centers for customer service, sales forces, or other call functions. Agents of the call center are trained to answer the customer's query.

SUMMARY

In one embodiment, a method, and corresponding system, of speaker verification includes identifying a target speaker's speech, using a known speaker voiceprint, from an audio recording that includes the target speaker's speech and the known speaker's speech. The known speaker voiceprint can correspond to the known speaker. Extracting the target speaker's speech can include determining portions of the audio recording where the known speaker voiceprint matches the known speaker's speech above a particular threshold, and extracting the target speaker's speech from other portions of the audio recording. Extracting the target speaker's speech can also include, for example, segmenting the audio recording into at least two files, each of the files belonging to a single speaker but with unknown identities, using the known speaker's voiceprint to detect which file belongs to the known speaker, and assuming the other file is the target speaker.

In another embodiment, identifying the target speaker's speech can include extracting the target speaker's speech.

In another embodiment, the method can include verifying the target speaker based on the target speaker's voiceprint.

In yet a further embodiment, the known speaker can be an agent of a call center, and the target speaker can be a caller to the call center that is conversing with the agent.

In an additional embodiment, the method can further include segmenting the audio recording into a first audio file of the target speaker's speech, based on the extracted speech, and a second audio file of the known speaker's speech. The method can additionally include discarding the audio of the known speaker's speech. The method can further include recording the audio recording of the target speaker and the known speaker in a single-channel audio file. The method can additionally include determining portions of the audio recording where the known speaker voiceprint matches the known speaker's speech above a particular threshold, and extracting the target speaker's speech from other portions of the audio recording.

In another embodiment, the method can include segmenting the audio recording into at least two audio recordings. The method can further include associating a first recording of the at least two audio recordings to the known speaker by matching the known speaker's voiceprint to the first recording. The method can additionally include discarding the first recording. The method can also include associating a second recording of the at least two audio recordings to the target speaker. The method can additionally include returning the second recording. The method can further return a score of the second recording, first recording, or both.

In another embodiment, extracting the target speaker's speech can further use a target speaker voiceprint and the known speaker voiceprint.

In another embodiment, the method can include reporting a representation of the extracted target speaker's speech.

In another embodiment, a system for speaker verification includes an extraction module configured to identify a target speaker's speech, using a known speaker voiceprint, from an audio recording that includes the target speaker's speech and the known speaker's speech. The known speaker voiceprint can correspond to the known speaker. The system can further include a reporting module configured to report a score representing the extracted target speaker's speech.

In one embodiment, the reporting module can be configured to report the representation of the extracted target speaker's speech by reporting at least one of an extracted target speaker's speech's speaker, a score, a pointer, encoded data, and a signal.

A file or audio file, as described in this Application, can be an audio stream, buffer, or memory buffer, or recording.

DETAILED DESCRIPTION

A description of example embodiments of the invention follows.

A call center can record conversations for quality assurance and other purposes. The call center may also perform speaker verification to verify the identity of the customer calling the call center. To do so, the call center separates the customer's speech from the agent's speech. A call center can do this by recording a call in stereo; that is, recording the customer on one audio channel and the agent on another channel. However, the call center may not have stereo recording technology, or may want to record in mono (i.e., single channel) to save space on a media drive storing the recordings.

The call center has the capability to record its agents more than its customers because the agents are its employees. Therefore, the call center can build a reliable voiceprint based on high quality data for each of its agents. Recorded data of customers can be more sparse for the call center, so a voiceprint of the customer can be reliable, but of a lower quality, for example.

A call center that records in mono segments the audio file based on the two speakers recorded in the audio file. One way to segment the audio file is to use blind segmentation program that separates the two speakers using their acoustic difference. Speaker verification with the agent's voiceprint is used to detect which of the resulting files contains the agent's speech and which file contains the customer's speech. Another way to segment the audio file is to identify the agent, or known speaker, based on the reliable voiceprint. The call center can then isolate the speech of the customer by knowing where the known speaker's speech is in the mono audio file. From there, the call center can verify the speech of the customer, or target speaker, by using the voiceprint of the customer. In other words, given a segmented audio recording of a known speaker and target speaker, the system uses the voiceprint of the known speaker to discard the speech belonging to that speaker and use the remaining speech recording(s) to either create a voiceprint for the target speaker or verify an existing voiceprint for a target speaker.

Speaker segmentation and verification can also be used in other contexts outside of call centers. For example, in the public security context, a recording of a suspect by a law enforcement officer can be recorded, segmented and verified. A person of ordinary skill in the art can recognize other contexts for such a system. Call centers, as described herein, can be replaced by other environments that employ speakers segmentation and verification.

Figure 1:
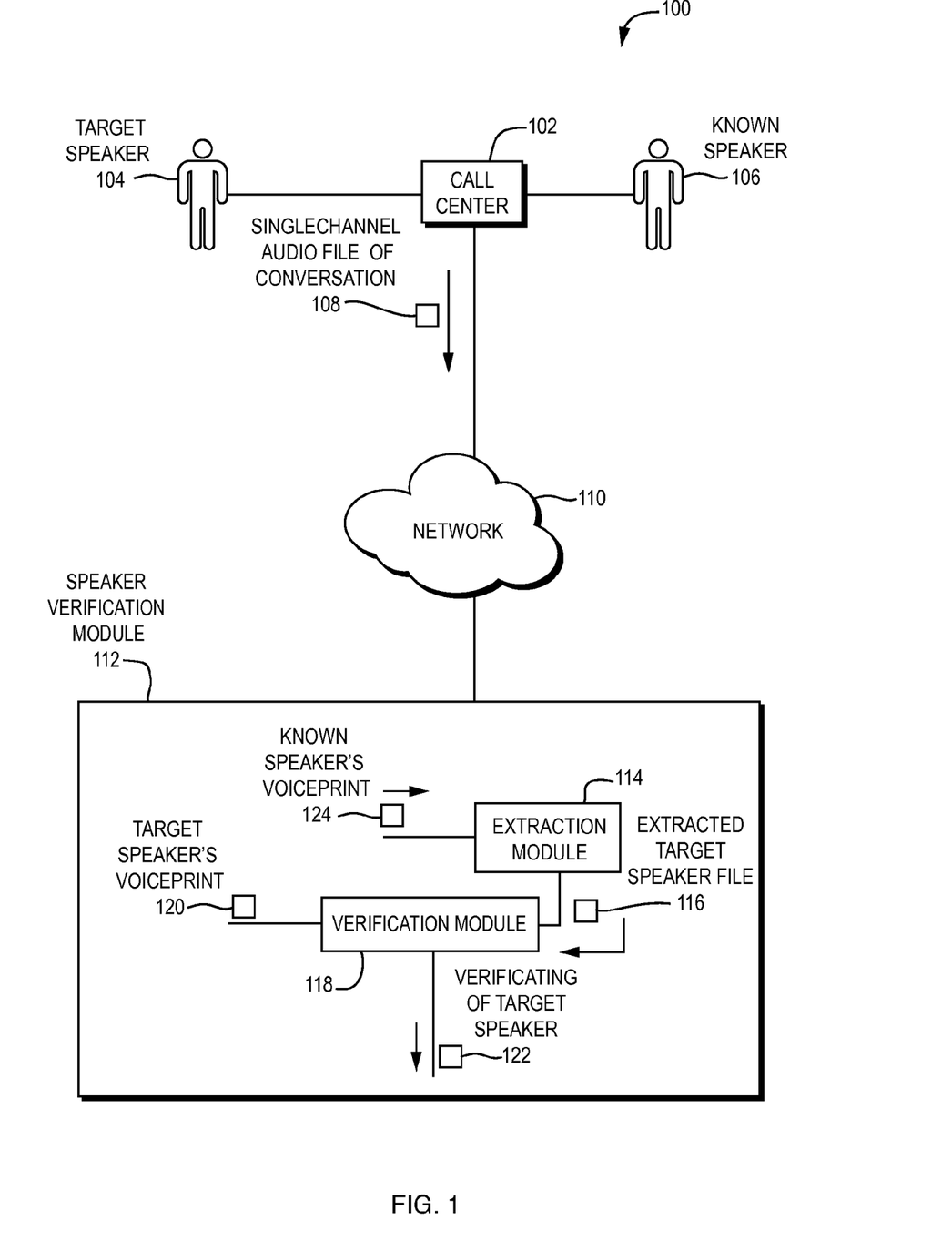
FIG. 1 is a block diagram illustrating example embodiment of speaker verification in a single channel audio file.

FIG. 1 is a block diagram 100 illustrating example embodiment of speaker verification in a single channel (e.g., mono) audio file. A target speaker 104 converses with a known speaker 106 through a call center 102. In a common embodiment, the target speaker 104 is a caller to the call center 102, and the known speaker 106 is an agent of the call center 102. Because the known speaker 106 is an agent of the call center 102, the call center 102 can have plenty of stored recordings of the known speaker 106 that can be employed to generate an accurate voiceprint of the known speaker 106. The call center 102 may or may not have a voiceprint of the target speaker 104; however, because the target speaker 104 is a caller to the call center 102, it is likely that the call center has more recordings or longer recordings of the known speaker 106 compared to the target speaker 104. Therefore, the voiceprint of the known speaker 106 is likely to be more accurate than a voiceprint of the target speaker 104. In this manner, the goal of the system described herein is to leverage the more accurate voiceprint of the known speaker 106 to isolate the speech of the target speaker 104 and verify the identity of the target speaker 104.

The call center 102, after or while recording the conversation between the target speaker 104 and the known speaker 106, generates a single channel audio file of the conversation 108. The call center 102 sends the single channel audio file 108 to a speaker verification module 112 over a network 110. The speaker verification module 112 is configured to receive the single channel audio file 108, extract the target speaker's speech from the single channel audio file 108, and verify that the target speaker's 104 identity.

The speaker verification module 112 includes an extraction module 114. The extraction module 114 receives the single channel audio file 108 and the known speaker's voiceprint 124. The extraction module 114, based on the known speaker's voiceprint 124, flags the portions of the single channel audio file 108 with the known speaker's speech for extraction and removal. The extraction module 114, therefore, generates an extracted target speaker file 116 that does not contain the known speaker's 106 speech and only contains the target speaker's 104 speech. The extracted target speaker file 116 is forwarded to a verification module 118. The verification module 118 compares the extracted target speaker file 116 to a target speaker voiceprint 120. If the speech within the extracted target speaker file 116 matches the target speaker voiceprint 120 above a certain threshold, the system issues a verification of the target speaker 122. On the other hand, if the target speaker voiceprint 120 does not match the extracted target speaker file 116, the verification module 118 does not issue the verification.

Figure 2:
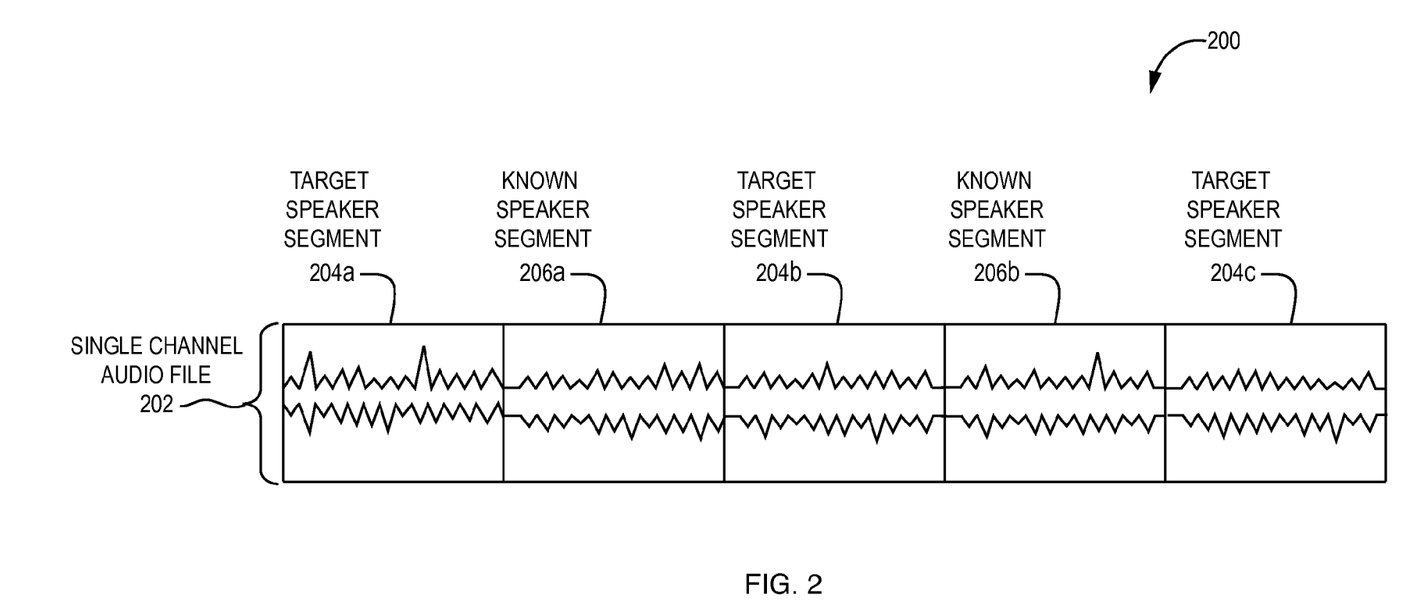
FIG. 2 is a block diagram illustrating an example embodiment of a single channel audio file with recordings from a target speaker conversing with a known speaker.

FIG. 2 is a block diagram 200 illustrating an example embodiment of a single channel audio file 202 with recordings from a target speaker conversing with a known speaker. The single channel audio file 202 includes target speaker segments 204a-c and known speaker segments 206a-b. The segments are interspersed according to a back-and-forth flow of a conversation. As the single channel audio file 202 is mono, not stereo, the file itself does not distinguish between the target speaker segments 204a-c, and known speaker segments 206a-b.

Figure 3:
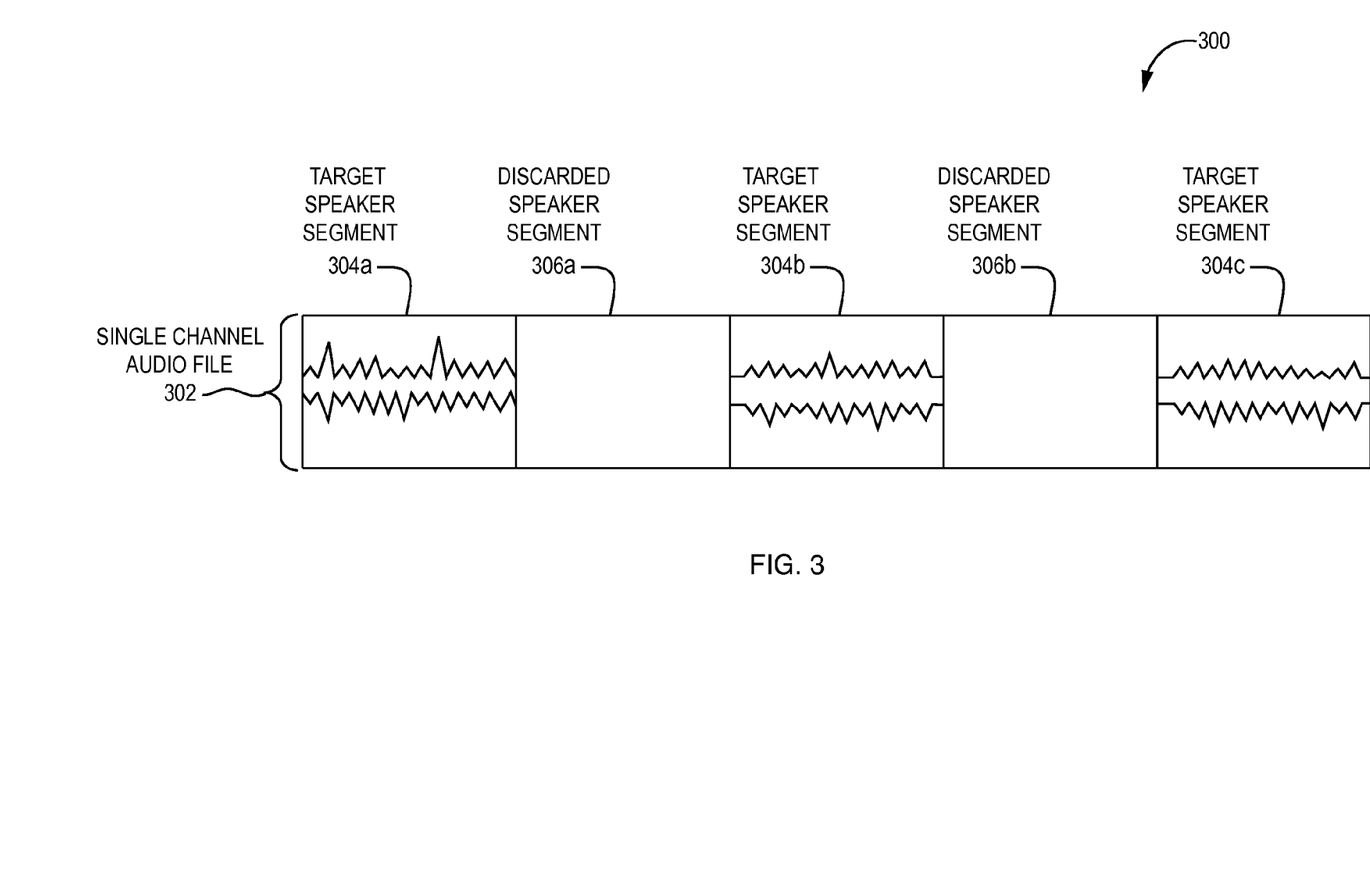
FIG. 3 is a block diagram of a single channel audio file after speaker segmentation in accordance with the present invention.

FIG. 3 is a block diagram 300 of a single channel audio file 302 after speaker segmentation in accordance with the present invention. The single channel audio file 302 contains target speaker segments 304a-c, just as in FIG. 2. However, instead of the known speaker segments 206a-b as in FIG. 2, the single channel audio file 302 of FIG. 3 includes discarded speaker segments 306a-b. The target speaker segments 304a-c are sent to a speaker verification system (not shown). Any speaker verification system known in the art may be used.

Figure 4A:
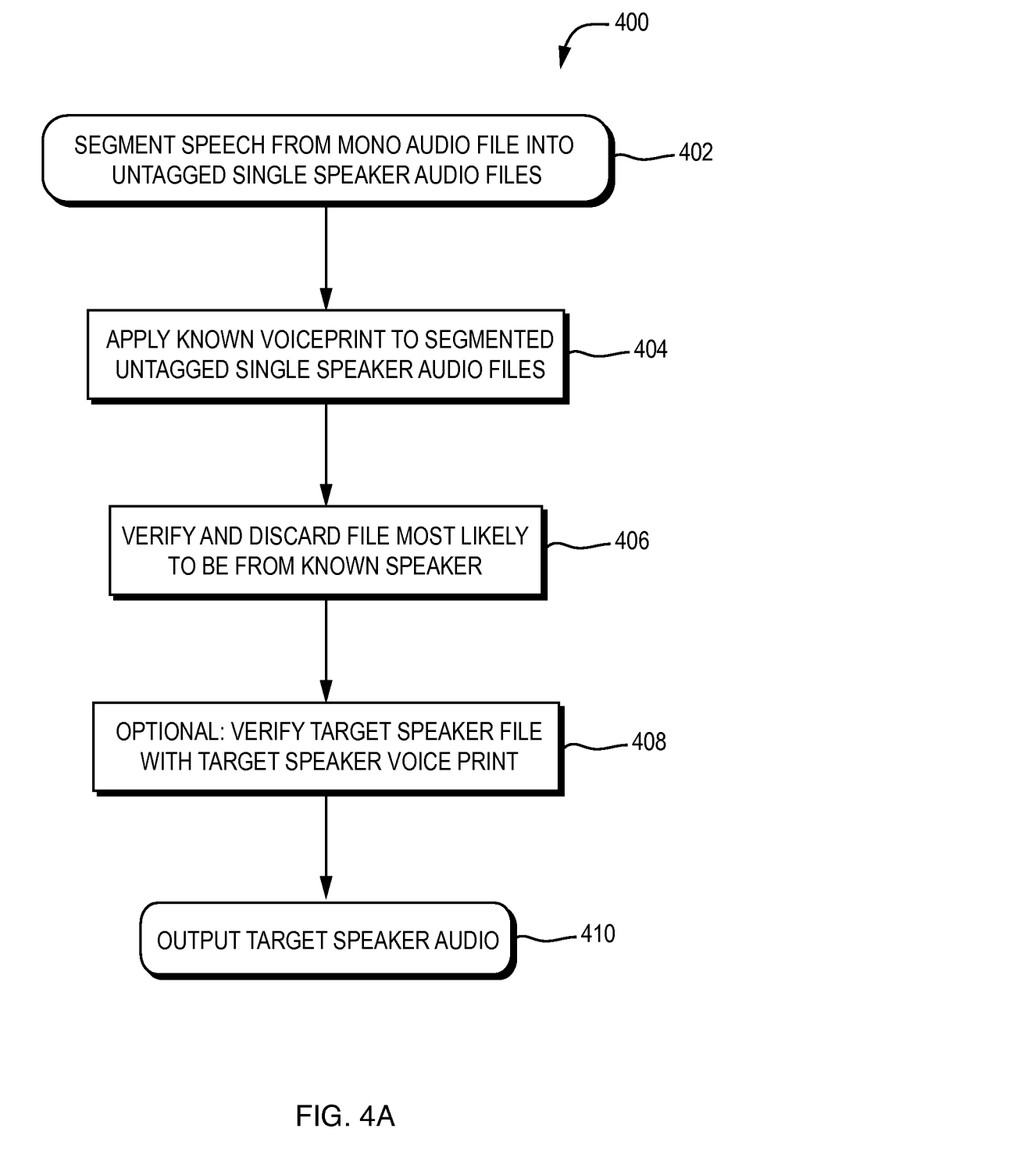
FIG. 4A is a flow diagram illustrating an example embodiment of a method employed by the present invention.

FIG. 4A is a flow diagram 400 illustrating an example embodiment of a method employed by the present invention. The method segments speech from a mono audio source (e.g., a file) into untagged single speaker audio files (402). Then, the method applies a known voiceprint to the segmented untagged single speaker audio files (404). Applying the known voiceprint can include tagging speech of the known speaker (e.g., the speaker indicated by the voiceprint). The method then verifies and discards the tagged file, which is the file most likely to be from the known speaker (406). Optionally, the method verifies the remaining file of the target speaker with a target speaker voiceprint, if a target speaker voiceprint is available (408). Then, the method outputs the target speaker audio (410).

Figure 4B:
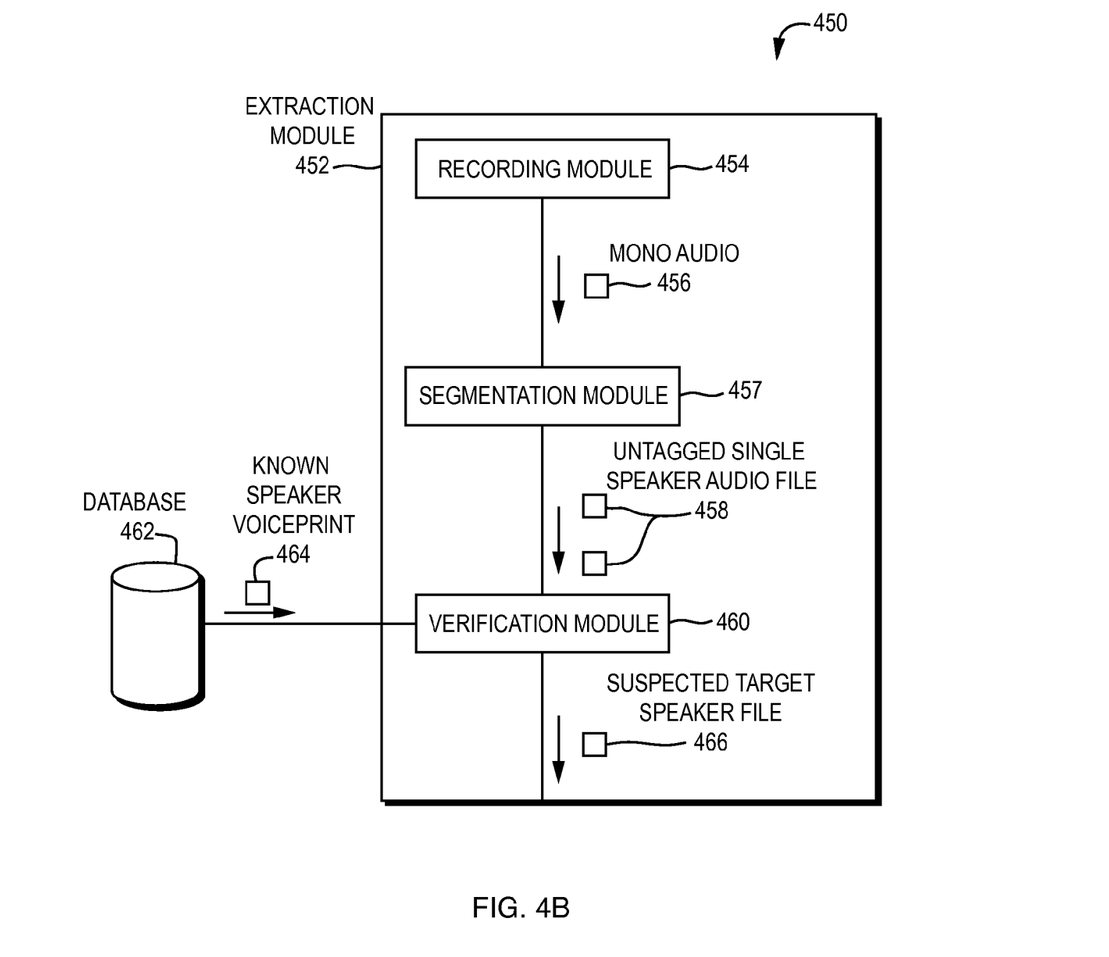
FIG. 4B is a flow diagram illustrating an example embodiment of an extraction module.

FIG. 4B is a block diagram 450 illustrating an example embodiment of an extraction module 452 employed by the present invention. The extraction module includes a recording module 454 which records a mono audio file 456. The mono audio file 456 is forwarded to a segmentation module 457, which separates the mono audio file 456 into untagged single speaker audio files 458. The untagged single audio files 458 are separate audio files with distinct speakers. Any segmentation system known in the art may be used. The identity of the speakers within the untagged single audio files 458 is unknown at this point. The segmentation module 457 forwards the untagged single speaker audio files 458 to a verification module 460. The verification module 460 loads a known speaker voiceprint 464 from a database 462 and determines a suspected target speaker file 466 by identifying the known speaker file and assuming that the other untagged single speaker audio file 458 contains speech of the target speaker. The known file can then be discarded, and the suspected target speaker file 466 can be optionally verified using a target speaker voiceprint.

Figure 5:
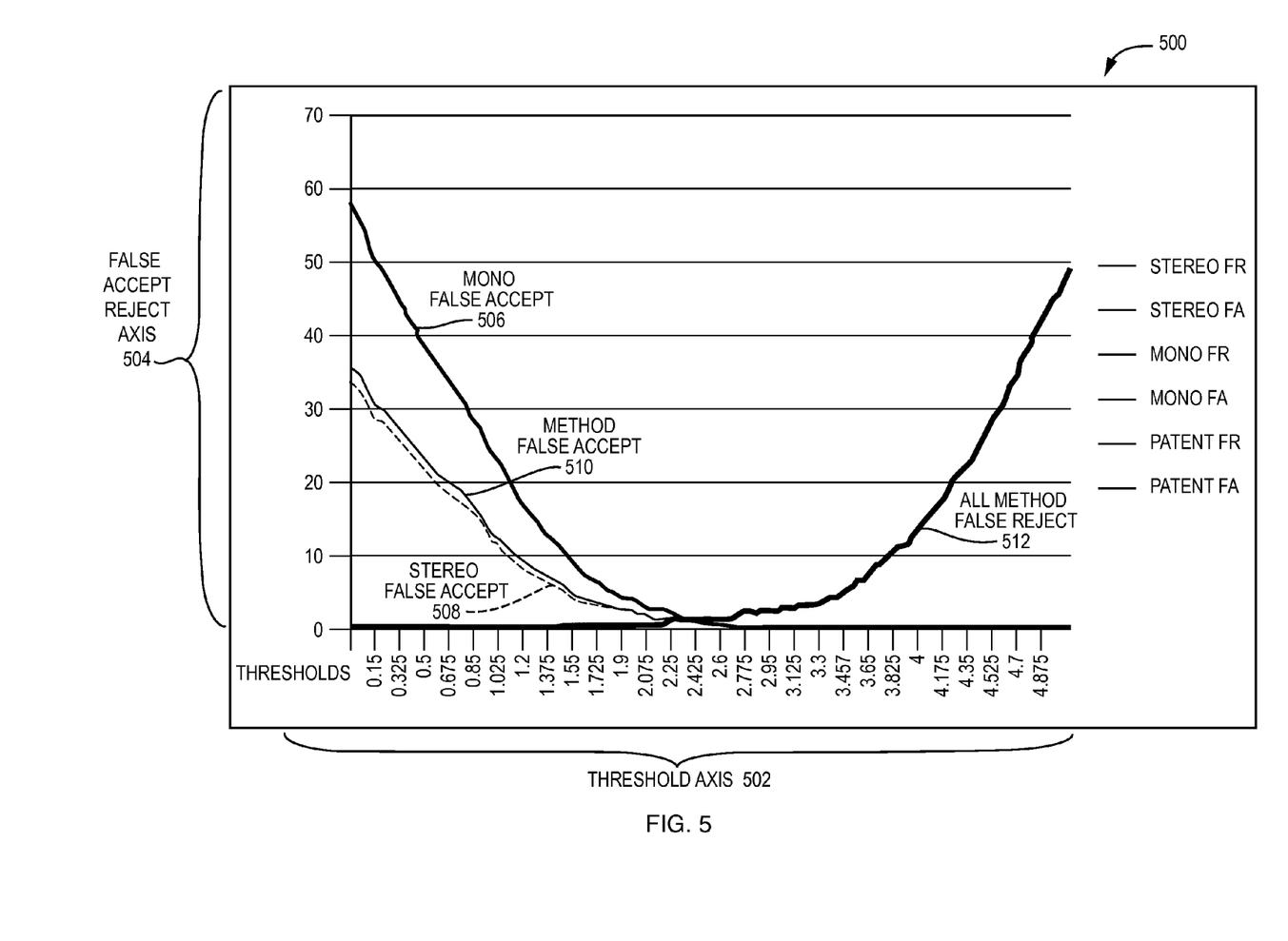
FIG. 5 is a graph illustrating an example embodiment of false accept rates and false reject rates for different methods of speaker segmentation.

FIG. 5 is a graph 500 illustrating an example embodiment of false accept rates and false reject rates for different methods of handling mono recordings. The graph 500 shows a threshold axis 502 and a false accept/reject axis 504. A common method includes employing segmentation of the verified file and seeking a maximal score on both verified files. This results in the mono false accept rate 506, which is shown to be the highest. For reference, the stereo ideal case false accept rate 508 is shown. The invention false accept rate 510 is shown to be approximately equal to the stereo case. All three methods had the equal or equivalent false reject rates 512.

Enrollment of speakers was performed by employing a common speakers library. A "common speakers library" supports locating a speaker that is present in a number of recordings. For example, a common speakers library may store 10 agent-customer recordings where the same agent is speaking in each recording. The common speakers library allows the speech for the common speaker to be accumulated from multiple recordings such that a more accurate voiceprint can be created. During speaker verification, segmentation was performed on each audio file, resulting in two or more segments, or sides, of each audio file. Each side was verified against both the agent and the target user. If the agent score of a side was higher than a threshold, then that side was discarded. The maximum user score among the remaining sides was used as the user scores. If all sides were removed, then a low negative value of −5 was used, which causes a rejection.

The results from the experiment show agent side rejection improves the accuracy significantly, and leads to accuracy matching the stereo case. The experiment employed a full stereo recording, and mono recordings using fast speaker segmentation and accurate speaker segmentation. Accurate speaker segmentation generally uses more parameters than fast speaker segmentation, and correspondingly, uses more processing time and/or power.

Using full stereo and a threshold for identifying the agent of "3.5," the system had a 1% error rate and a 1% error rate when using agent verification to remove the agent audio. When the target side was unknown, the error rate was 1.3%.

In a single-channel audio file using fast segmentation, when the target side was known, the error rate was 1.9%. When also employing agent verification to remove the agent side, the error rate was 1.3%.

In a single-channel audio file using the accurate segmentation described in the present application, the error rate when the target side was unknown was 1.2%, which is an improvement over the results of the full stereo and fast segmentation tests. Further, when using agent verification to remove the agent side, the error was 0.9%, another improvement over the full stereo and fast segmentation tests.

Figure 6:
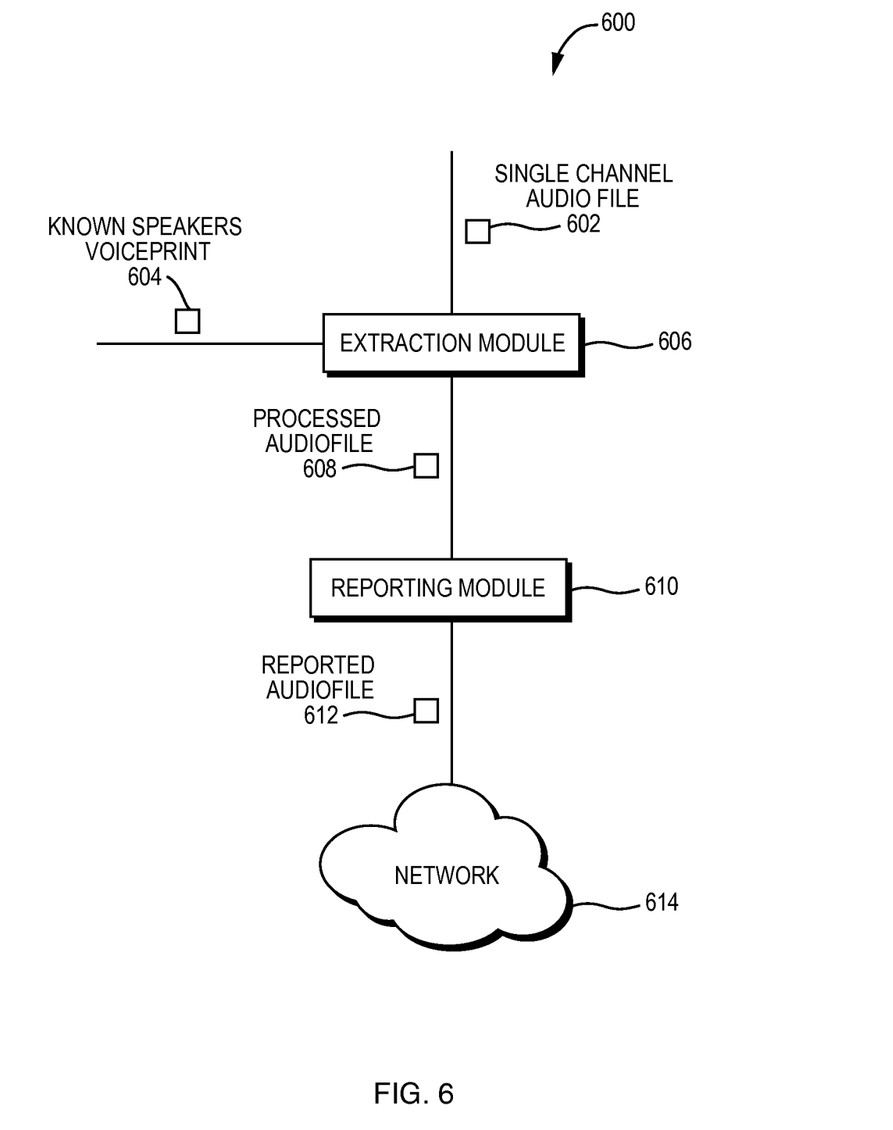
FIG. 6 is a block diagram illustrating an example embodiment of a system employing the present invention.

FIG. 6 is a block diagram 600 illustrating an example embodiment of a system employing the present invention. An extraction module 606 receives a single channel audio file 602 and a known speaker voiceprint 604. The extraction module extracts the target speaker from the single channel audio file 602 by removing the known speaker based on the known speaker voiceprint 604. The extraction module transfers a processed audio file 608 to a reporting module 610. The reporting module 610 reports a reported audio file 612 to a system, such as a network 614.

Speaker verification is described in further detail in "Method and apparatus for efficient I-vector extraction," U.S. application Ser. No. 13/762,213 by Sandro Cumani and Pietro Laface and in "Method and apparatus for automated parameters adaptation in a deployed speaker verification system," U.S. application Ser. No. 13/776,502 by Daniele Ernesto Colibro, Claudio Vair and Kevin R Farrell. The teachings of all patents, published applications and references cited herein are incorporated by reference in their entirety. Herein, as used in this Application, should not be interpreted as restricting the incorporation of definitions into any subsequent application, such as a continuation, continuation-in-part, divisional, or other related application.

Figure 7:
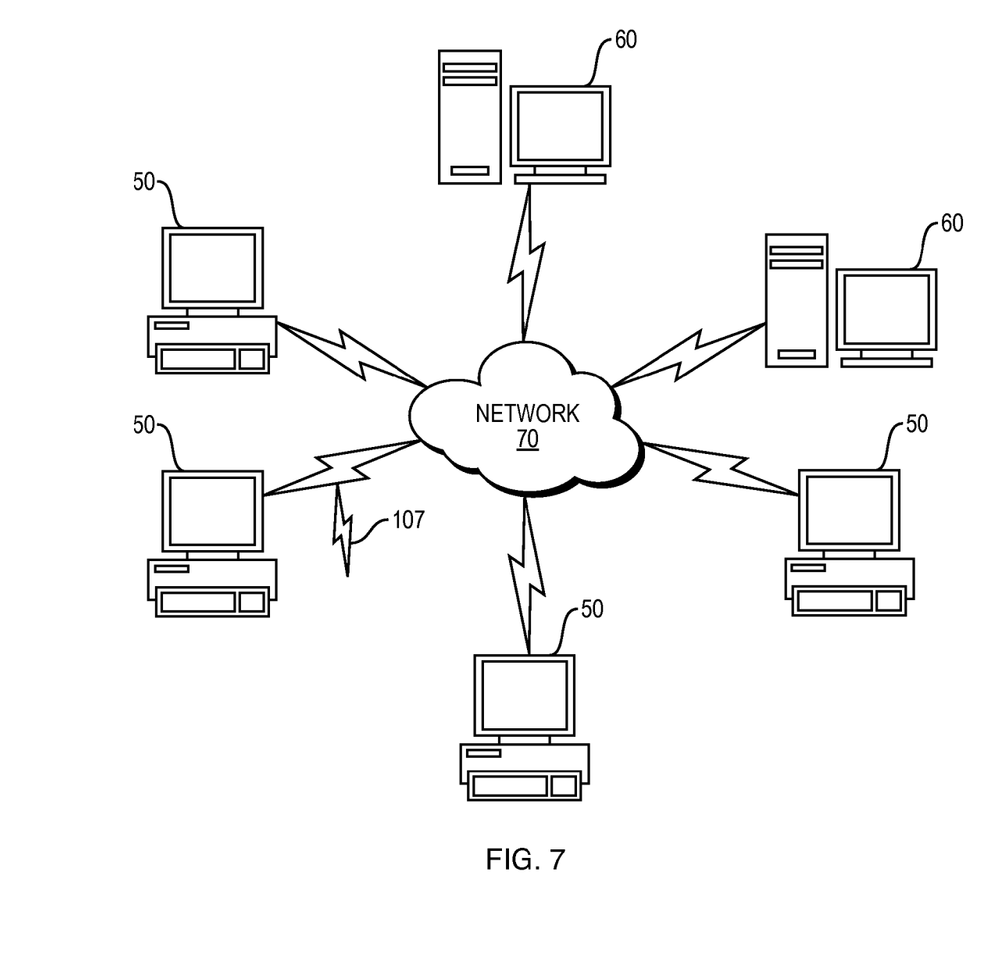
FIG. 7 illustrates a computer network or similar digital processing environment in which embodiments of the present invention may be implemented.

FIG. 7 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 8:
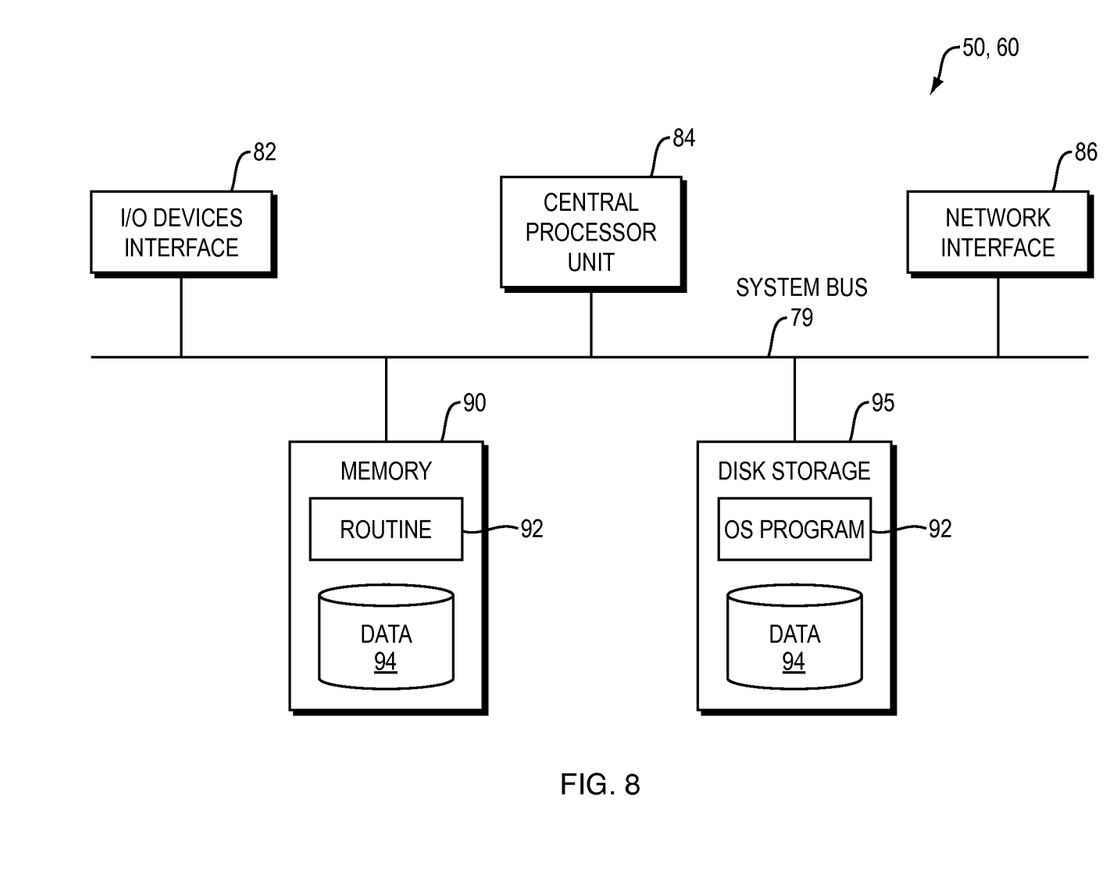
FIG. 8 is a diagram of an example internal structure of a computer (e.g., client processor/device or server computers) in the computer system of FIG. 7.

FIG. 8 is a diagram of an example internal structure of a computer (e.g., client processor/device 50 or server computers 60) in the computer system of FIG. 7. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 7). Memory 90 provides volatile storage for computer software instructions 92 and data 94 used to implement an embodiment of the present invention (e.g., structure generation module, computation module, and speaker segmentation code detailed above). Disk storage 95 provides non-volatile storage for computer software instructions 92 and data 94 used to implement an embodiment of the present invention. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, infrared wave, laser wave, sound wave, or electrical wave propagated over a global network such as the Internet or other network(s)). Such carrier medium or signals may be employed to provide at least a portion of the software instructions for the present invention routines/program 92.

In alternative embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer.

While this invention has been particularly shown and described with references to example embodiments thereof, it will be understood by those skilled in the art that various changes in form and details may be made therein without departing from the scope of the invention encompassed by the appended claims.

What is claimed is:

1. A method of speaker verification, the method comprising:
    identifying, by a processor, a target speaker's speech, using a known speaker voiceprint, from an audio recording that includes the target speaker's speech and a known speaker's speech, the known speaker voiceprint corresponding to the known speaker, wherein using the known speaker voiceprint includes enabling exclusion of speech segments of the known speaker's speech to reduce a total number of speech segments used to verify the target speaker's speech to improve accuracy with reduced processing time or power for verifying relative to having all speech segments of the target and known speaker's speech under consideration; and
    verifying, by the processor, the target speaker based on the target speaker's voiceprint, an accuracy of the known speaker voiceprint being higher relative to an accuracy of the target speaker's voiceprint.

2. The method of claim 1, wherein the known speaker is an agent of a call center and the target speaker is a caller to the call center that is conversing with the agent.

3. The method of claim 1, further comprising:
    segmenting the audio recording into at least two audio recordings.

4. The method of claim 3, further comprising:
    associating a first recording of the at least two audio recordings with the known speaker by matching the known speaker's voiceprint to the first recording;
    discarding the first recording; and
    associating a second recording of the at least two audio recordings with the target speaker.

5. The method of claim 4, further comprising returning the second recording.

6. The method of claim 1, further comprising recording the audio recording of the target speaker and the known speaker in a single-channel audio recording.

7. The method of claim 1, further comprising reporting a representation of the extracted target speaker's speech.

8. The method of claim 1, wherein extracting the target speaker's speech further uses a target speaker voiceprint and the known speaker voiceprint.

9. A system for speaker verification, the system comprising:
    an extraction module configured to identify a target speaker's speech, using a known speaker voiceprint, from an audio recording that includes the target speaker's speech and the known speaker's speech, the known speaker voiceprint corresponding to the known speaker, wherein using the known speaker voiceprint includes enabling exclusion of speech segments of the known speaker's speech to reduce a total number of speech segments used to verify the target speaker's speech to improve accuracy with reduced processing time or power for verifying relative to having all speech segments of the target and known speaker's speech under consideration; and
    a reporting module configured to report a representation of the extracted target speaker's speech.

10. The system of claim 9, further comprising a verification module configured to verify the target speaker based on the target speaker's voiceprint.

11. The system of claim 9, wherein the known speaker is an agent of a call center and the target speaker is a caller to the call center that is conversing with the agent.

12. The system of claim 9, wherein the extraction module is further configured to segment the audio recording into at least two audio recordings.

13. The system of claim 12, wherein the extraction module is further configured to associate a first recording of the at least two audio recordings with the known speaker by matching the known speaker's voiceprint to the first recording, discarding the first recording, and associate a second recording of the at least two audio recordings with the target speaker.

14. The system of claim 13, further comprising a return module configured to return the second recording.

15. The system of claim 9, further comprising a recording module configured to record the audio recording of the target speaker and the known speaker in a single-channel audio recording.

16. The system of claim 9, wherein the reporting module is configure to report the representation of the extracted target speaker's speech by reporting at least one of an extracted target speaker's speech's speaker, a score, a pointer, encoded data, and a signal.

17. The system of claim 9, wherein the extraction module is further configured to extract the target speaker's speech by using a target speaker voiceprint and the known speaker voiceprint.

18. A non-transitory computer-readable medium configured to store instructions for speaker verification, the instructions, when loaded and executed by a processor, cause the processor to extract target speaker's speech, using a known speaker voiceprint, from an audio recording that includes the target speaker's speech and the known speaker's speech, the known speaker voiceprint corresponding to the known speaker, wherein using the known speaker voiceprint includes enabling exclusion of speech segments of the known speaker's speech to reduce a total number of speech segments used to verify the target speaker's speech to improve accuracy with reduced processing time or power for verifying relative to having all speech segments of the target and known speaker's speech under consideration.

19. The non-transitory computer-readable medium of claim 18, wherein the instructions further cause the processor to verify the target speaker based on the target speaker's voiceprint.

20. The method of claim 1 wherein excluding includes extracting speech segments of the target speaker's speech from the audio recording.

21. The method of claim 1 wherein excluding includes discarding speech segments of the known speaker's speech from the audio recording.

* * * * *